US006837670B2

(12) United States Patent
Goodrich

(10) Patent No.: US 6,837,670 B2
(45) Date of Patent: Jan. 4, 2005

(54) WHEELCHAIR ACCESS SYSTEM WITH STACKING PLATFORM

(75) Inventor: Ronald W. Goodrich, Logansport, IN (US)

(73) Assignee: The Braun Corporation, Winamac, IN (US)

( * ) Notice: Subject to any disclaimer, the term of this patent is extended or adjusted under 35 U.S.C. 154(b) by 11 days.

(21) Appl. No.: 10/353,544

(22) Filed: Jan. 29, 2003

(65) Prior Publication Data

US 2004/0146386 A1 Jul. 29, 2004

(51) Int. Cl.[7] .................................................. B60P 1/44
(52) U.S. Cl. .............................. 414/546; 414/DIG. 921
(58) Field of Search ........................ 414/546, DIG. 921

(56) References Cited

U.S. PATENT DOCUMENTS

| | | | |
|---|---|---|---|
| 3,651,965 A | 3/1972 | Simonelli et al. | |
| 4,007,844 A | 2/1977 | Perkins | |
| 4,121,695 A | 10/1978 | Carpenter | |
| 4,140,230 A | 2/1979 | Pearson | |
| 4,251,179 A | 2/1981 | Thorley | |
| 4,353,436 A | 10/1982 | Rice et al. | |
| 4,408,948 A | 10/1983 | Robinson | |
| 4,479,753 A | 10/1984 | Thorley | |
| 4,534,450 A | 8/1985 | Savaria | |
| 4,664,584 A * | 5/1987 | Braun et al. | 414/541 |
| 4,685,858 A | 8/1987 | Manning et al. | |
| 4,984,955 A | 1/1991 | McCullough | |
| 5,026,244 A | 6/1991 | Dorn | |
| 5,180,275 A | 1/1993 | Czech et al. | |
| 5,261,779 A * | 11/1993 | Goodrich | 414/546 |
| 5,401,135 A | 3/1995 | Stoen et al. | |
| 5,445,488 A | 8/1995 | Saucier et al. | |
| 5,524,952 A | 6/1996 | Czech et al. | |
| 5,542,811 A | 8/1996 | Vartanian | |
| 5,564,884 A | 10/1996 | Farsai | |
| 5,605,431 A | 2/1997 | Saucier et al. | |
| 5,613,825 A | 3/1997 | Dorn | |
| 5,628,610 A | 5/1997 | Stratman et al. | |
| 5,653,568 A | 8/1997 | Josephs | |
| 5,672,041 A | 9/1997 | Ringdahl et al. | |
| 5,703,450 A | 12/1997 | Josephs | |

(List continued on next page.)

*Primary Examiner*—Eileen D. Lillis
*Assistant Examiner*—Rashmi Sharma
(74) *Attorney, Agent, or Firm*—Michael Best & Friedrich LLP

(57) ABSTRACT

A wheelchair access system with a stacking platform for use in conjunction with a vehicle having a floor, which includes a right-side vertical arm and an elongated support with a first and second portion. The first portion of the elongated support is pivotably coupled with the vertical arm. The vertical arm operates for deployment of the platform structure. The left side also has a vertical arm and an elongated support with a first and second portion, the first portion of which is coupled with the vertical arm. There is a fixed platform section attached intermediate to the first portions of the right-side and left-side elongated supports and an actuator that is powerable for moving the right-side and left-side vertical arms between positions that are both outboard and inboard the vehicle. Advantageously, the system includes a moveable platform section that is coupled intermediate to the right-side and left-side elongated supports for movement between the first and second portions of the right-side and left-side elongated supports. A linkage connects to the moveable platform section for movement with the actuator between a stowed orientation with the moveable platform section stowed as being stacked with the fixed platform section at the first portions of the right-side and left-side elongated supports and a deployed orientation when the moveable platform section is moved to the second portions of the right-side and left-side elongated supports.

20 Claims, 11 Drawing Sheets

U.S. PATENT DOCUMENTS

| | | | | | |
|---|---|---|---|---|---|
| 5,751,124 | A | | 5/1998 | Josephs | |
| 5,806,632 | A | | 9/1998 | Budd et al. | |
| 5,865,593 | A | | 2/1999 | Cohn | |
| 5,890,545 | A | | 4/1999 | Smith et al. | |
| 5,944,473 | A | | 8/1999 | Saucier | |
| 5,960,909 | A | | 10/1999 | Horcher et al. | |
| 6,053,693 | A | | 4/2000 | Ringdahl et al. | |
| 6,065,924 | A | * | 5/2000 | Budd et al. | 414/546 |
| 6,086,314 | A | | 7/2000 | Savaria | |
| 6,203,265 | B1 | | 3/2001 | Cohn et al. | |
| 6,203,266 | B1 | | 3/2001 | Savaria et al. | |
| 6,238,168 | B1 | | 5/2001 | Cohn et al. | |
| 6,238,169 | B1 | * | 5/2001 | Dupuy et al. | 414/546 |
| 6,340,280 | B1 | | 1/2002 | Mollick | |
| 6,357,992 | B1 | | 3/2002 | Ringdahl et al. | |
| 6,379,102 | B1 | * | 4/2002 | Kameda | 414/546 |
| 6,398,479 | B1 | | 6/2002 | Dupuy et al. | |
| 6,435,804 | B1 | | 8/2002 | Hutchins | |
| 6,554,086 | B1 | | 4/2003 | Goertzen et al. | |

* cited by examiner

FIG. 1
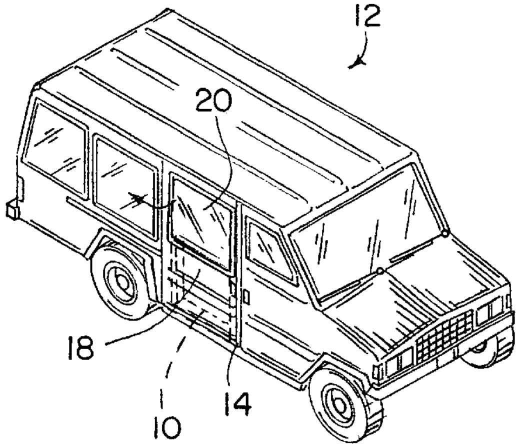
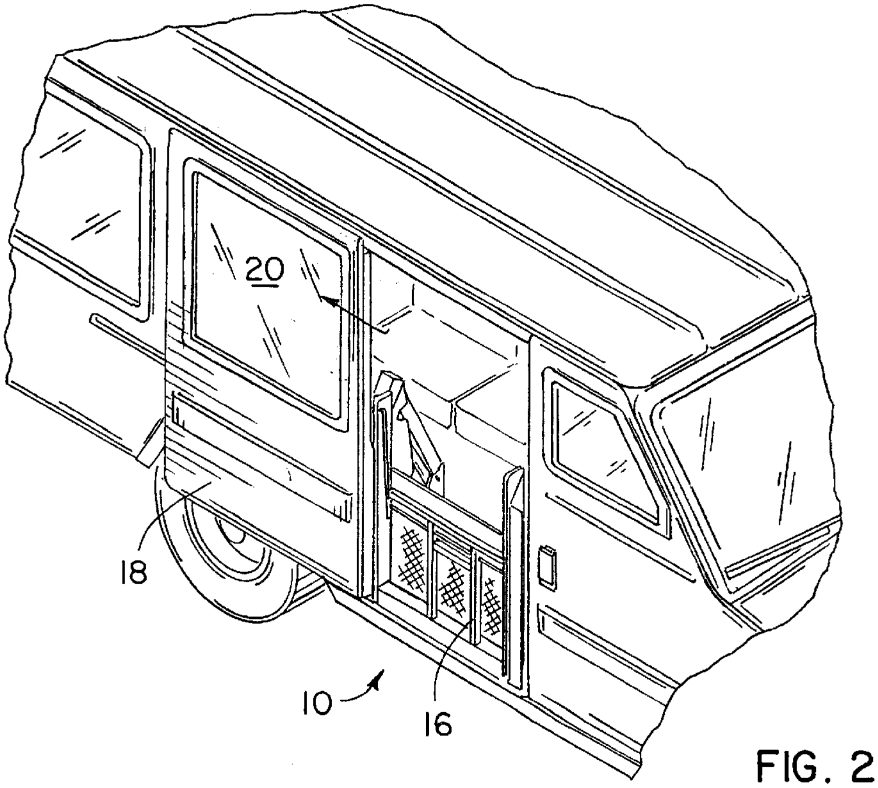
FIG. 2

WHEELCHAIR ACCESS SYSTEM WITH STACKING PLATFORM

BACKGROUND OF THE INVENTION

1. Field of the Invention

The present invention relates to wheelchair access systems employing platforms, and more particularly to a wheelchair lift platform structure having stacking platform sections for use in conjunction with a vehicle having a floor from which the system is deployed and stowed to provide an unobstructed view from within the vehicle.

2. Description of the Related Art

Vehicular wheelchair access systems for handicapped persons, such as lifts and ramps, can be mounted on vehicles and made deployable/stowable with respect to the vehicle. Wheelchair users typically move their wheelchair along the lift or ramp platforms in order to transfer from the ground to the vehicle and from the vehicle to the ground using a lift mechanism and platform structure, which may be operated mechanically, electrically, pneumatically or hydraulically, etc. Known wheelchair lift platform structures include solid rigid panels or floors as platform structures that must be stowed away within the vehicle itself. Accordingly, the wheelchair access system is used in conjunction with a portion of the floor space of the vehicle and further may obstruct passageways and restrict the amount of available space within the vehicle.

For handicapped persons, mobility is enhanced with the availability of wheelchair access systems that are powered to provide much or all of the movement of the motorized platform structure. This is particularly useful due to the inconvenience of physical activity by the wheelchair passenger. Such lifts typically have pivotal mechanisms for raising and lowering platform structures, see e.g., U.S. Pat. No. 5,261,779 to Goodrich for "Dual Hydraulic, Parallelogram Arm Wheelchair Lift" issued 16 Nov. 1993 and U.S. Pat. No. 6,238,169 to Depuy, et al. for "Dual Function Inboard Barrier/Bridge Plate Assembly for a Wheelchair Lift" issued 29 May 2001 to applicant's assignee. Each of these disclose dual hydraulic, parallelogram arm wheelchair lift assemblies for use typically in commercial vehicles. The lift assembly has a platform connected to a parallelogram linkage. In both of the above assemblies, when the platform of the lift is in a stowed position, the platform essentially blocks the doorway, making it very inconvenient to use the doorway or the windows on the vehicle door. Moreover, the wheelchair access system being fixed on the floor of the vehicle itself may provide limited space and visibility from and within the vehicle.

Other wheelchair lifts that do not completely block the door when in a stored position have been described, e.g., U.S. Pat. No. 4,664,584 to Braun, et al. for "Rotary Wheelchair Lift" issued 12 May 1987 discloses a rotary hydraulic lift having a vertically-telescoping slide tube and a horizontal wheelchair platform support arm attached to the lower end of the slide tube allowing the platform into or out of the vehicle parallel to the slide tube. However, the platform structure and pivotal mechanism employed in rotatable wheelchair lifts require a substantial amount of space.

Devices known in the prior art have only been partially successful in providing safety, stability and ease of operation in regard to the design of the lift and platform structure. Foldable and multiple section platform assemblies are known to decrease the platform area when not in use. Known examples of platform structures employing hinges between inner and outer platform sections such that the outer section rises and folds against the inner section on the outer side include U.S. Pat. No. 6,379,102 to Kameda for "Wheelchair Lift with Foldable Platform" issued 30 Apr. 2002. A lack of predictability of operation while being folded or unfolded, however, is a substantial disadvantage associated with this type of platform assembly when the platform structure is deployed from its stowed position. For example, in the stowed position the outer platform section, unless properly hooked, can dangle and assume a variety of positions. Roll-stops to prevent the wheelchair passenger or operator from interaction with the lift structural componentry have either not been provided or are not effective. Additionally, exposed rigid linkages may come in contact with the operator or passenger. Such linkages, in addition to being unsightly and annoying, may also present a substantial safety hazard to passengers and operators who come into with them during the operation of the lift. Moreover, cable systems have a number of other drawbacks, among them being that the cable is difficult to adjust properly and requires frequent readjustments as the cable stretches and tends to lengthen or shorten with temperature. In addition, a cable can fray or break in use and has limited strength. Many previously known lift devices also have a tendency to sway, rotate, jump or bind as the lift is operated, which provides additional potential risk.

To address the growing concern for passengers who are handicapped or otherwise have limited mobility, it would be desirable to provide compact, storable wheelchair access systems that minimize the space they occupy on the floor of the vehicle for storing the lift platform structure while providing for enhanced access to the door and particularly the door window for unobstructed views from within the vehicle.

SUMMARY OF THE INVENTION

The present invention relates to a wheelchair access system facilitating deployment from the floor of a vehicle with limited space for storage within the vehicle while providing an unobstructed view for occupants from within the vehicle. In a described embodiment, the wheelchair access system utilizes a parallelogram lift with a platform structure including at least two platform sections providing an extended platform floor when deployed. The platform sections include a fixed platform section and a moveable platform section, which may be stacked for storage in a stowed orientation with a low vertical profile allowing for an unobstructed view from within the vehicle.

The platform structure of the wheelchair access system deploys a pair of elongated supports having the fixed platform in a first portion of the elongated supports, while providing the moveable platform as being deployable from the first portion to the second portion of the elongated support pairs providing a platform floor with the fixed platform section alongside the moveable platform section when deployed. An actuator is powerable for moving vertical arms of the lift, which thereby pivot the elongated supports and move the moveable platform section between stowed and deployed orientations. Accordingly, the stowed orientation stacks the fixed platform section and the moveable platform section for a low vertical profile. Additionally, the horizontal profile of the wheelchair access system with the fixed platform section and moveable platform section in their stacked, stowed orientation minimizes the space used within the vehicle for storage while providing a less cumbersome structure than conventional wheelchair lift apparatus presently employed. Therefore the present invention makes it possible to provide an extended platform length when deployed without increasing the storage space within the vehicle and, furthermore, without obstructing the view through the vehicle window or door. By employing at least two platform sections, one moveable and one fixed, the platform structure may be automatically stacked and stowed in a position to form a low-height profile in a substantially vertical orientation adjacent the vehicle opening. To this end, the vertical height of the stacked platform structure may be approximately half the horizontal length of the unfolded platform structure with the wheelchair lift in the deployed orientation.

Briefly summarized, the present invention relates to a wheelchair access system with a stacking platform for use in conjunction with a vehicle having a floor, which includes a right-side vertical arm and an elongated support with a first and second portion. The first portion of the elongated support is pivotably coupled with the vertical arm. The vertical arm operates for deployment of the platform structure. The left side also has a vertical arm and an elongated support with a first and second portion, the first portion of which is coupled with the vertical arm. There is a fixed platform section attached intermediate to the first portions of the right-side and left-side elongated supports and an actuator that is powerable for moving the right-side and left-side vertical arms between positions that are both outboard and inboard the vehicle. Advantageously, the system includes a moveable platform section that is coupled intermediate to the right-side and left-side elongated supports for movement between the first and second portions of the right-side and left-side elongated supports. A linkage connects to the moveable platform section for movement with the actuator between a stowed orientation with the moveable platform section stowed as being stacked with the fixed platform section at the first portions of the right-side and left-side elongated supports and a deployed orientation when the moveable platform section is moved to the second portions of the right-side and left-side elongated supports.

DESCRIPTION OF THE DRAWINGS

The novel features believed characteristic of the invention are set forth in the appended claims. The invention itself, however, as well as the preferred mode of use, further objects and advantages thereof, are best understood by reference to the following detailed description of the embodiments in conjunction with the accompanying drawings, wherein:

FIGS. 1 and 2 show a vehicle employing a wheelchair access system in accordance with the present invention;

DESCRIPTION OF THE PREFERRED EMBODIMENTS

Figure 3:
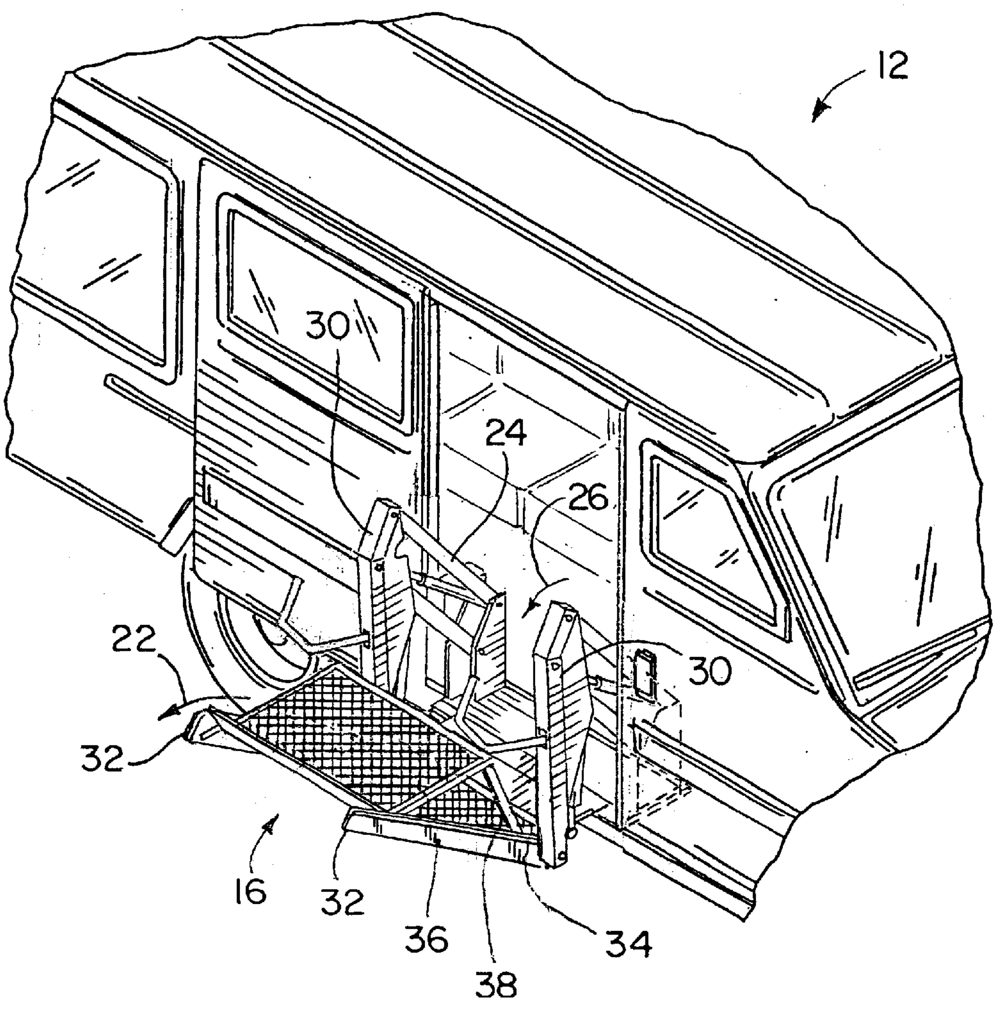
FIGS. 3, 4 and 5 illustrate the deployment of the wheelchair access system in various stages of deployment from the initial stowed position of FIG. 2 in accordance with the invention.

With reference to the drawings and particularly FIGS. 1 and 2, a wheelchair access system 10 is shown for use in conjunction with a vehicle 12. The vehicle 12 has a floor 14, upon which the wheelchair access system 10 is mounted, and from which a stacking platform structure 16 may be deployed and stowed. The vehicle 10 has a door 18 and a window 20 therein, which as shown in FIG. 2 may slide or otherwise provide open access to the vehicle 10 for use of the wheelchair access system 10. It will be appreciated that the stacking platform structure 16 of the wheelchair access system 10 has a sufficiently low vertical profile due to vertical clearance and sightline requirements so as to provide an unobstructed view through the window 20 with the stacking platform structure 16 in a vertically-stowed orientation.

Figure 4:
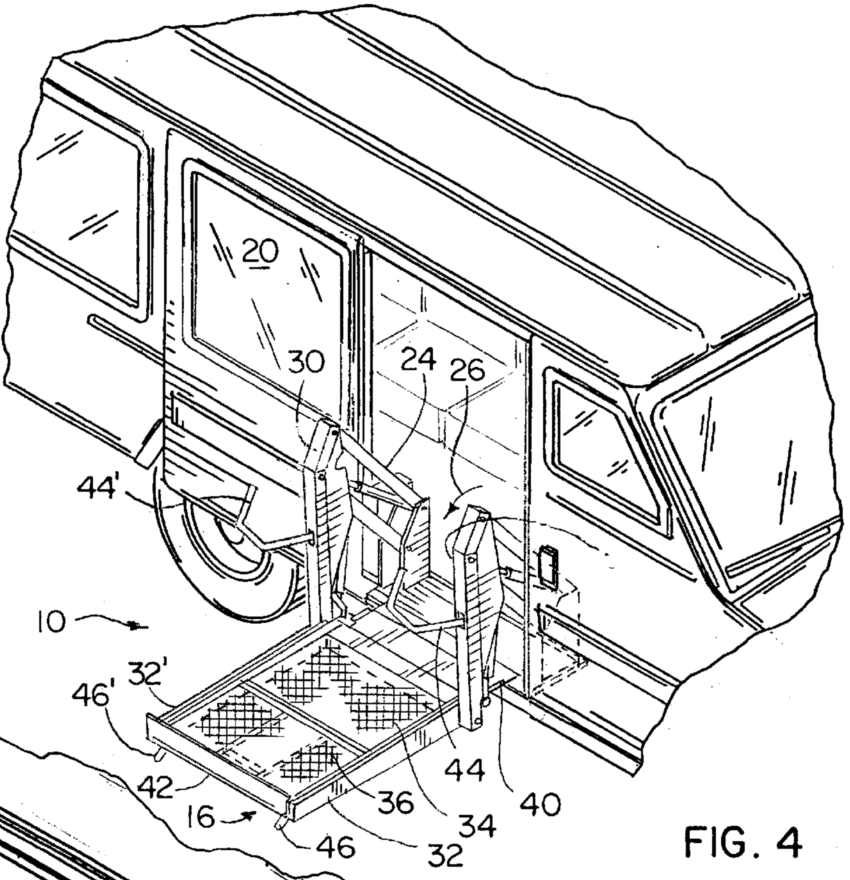
Figure 5:
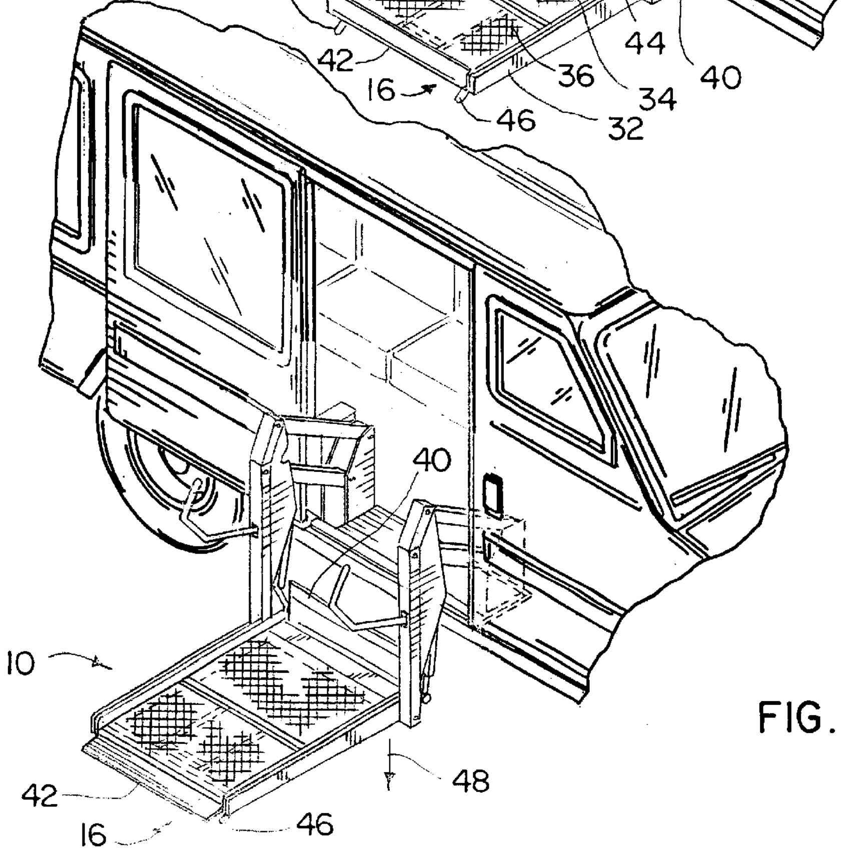

FIGS. 3, 4 and 5 are cut-away perspective views showing the side of the vehicle 12 with door 18 open and the platform structure 16 of the wheelchair access system 10 partially deployed in FIG. 3, with deployment proceeding through transfer level position at FIG. 4 and ground level position at FIG. 5. FIG. 3 particularly illustrates the use of a stacking platform operation with motion indicated by arrow 22 operable as the lift platform structure 16 is deployed with an actuator employable for moving between positions inboard and outboard vehicle 12 as indicated by the motion of arrow 26. Herein, the actuator 24 is provided as a parallelogram hydraulic cylinder mechanism employing pivotal mechanisms for raising and lowering platform structures as used in the wheelchair lift apparatus previously disclosed by applicant's assignee in U.S. Pat. No. 5,261,779 to Goodrich for “Dual Hydraulic Parallelogram Wheelchair Lift” issued 6 Nov. 1993, U.S. Pat. No. 6,238,169 to Depuy, et al. for “Dual Function In Board Barrier/Bridgeplate Assembly for a Wheelchair Lift” issued 29 May 2001, and U.S. Pat. No. 5,806,632 to Budd, et. al. for “Spring Assist System for Gravity Deployment of Stowed Platform Wheelchair Lifter” issued 15 Sept. 1998, which are hereby incorporated by reference in their entirety. With reference to FIG. 6, the general arrangement of the vehicle-mounted parallelogram wheelchair lift actuator 24 is further illustrated so as to show the hydraulic actuator cylinders 28 and 28' for operating the parallelogram structures that are coupled to a right-side vertical arm 30 and a left-side vertical arm 30' powerable for moving between positions outboard and inboard the vehicle 12. The parallelogram structure employing the hydraulic actuator 24 powerable for moving the right-side and left-side vertical arms 30, 30' employs a hydraulic pump/control assembly (not shown) mounted in the vehicle 12. Alternatively, other actuators powerable by way of mechanical, electrical or pneumatic operations and the like may be used for deploying and stowing the lift platform structure.

The wheelchair access system 10 is thus operable for deployment and stowing of the platform structure 16 with the right-side and left-side vertical arms 30, 30', each of which include an upper end and a lower end. As shown in FIG. 3, the system 10 further includes a right-side elongated support 32 and a left-side elongated support 32'. The right-side and left-side elongated supports 32, 32' each provide side rails and barriers of the respective right and left-hand sides of the platform structure 16, as discussed further below. The platform structure 16 includes a fixed platform section 34 attached intermediate to the right-side and left-side elongated supports 32, 32', and with reference to portions thereof, each elongated support includes the proximal half and a distal half with respect to the vertical arms 30, 30' such that each elongated support 32, 32' may be referenced in terms of portions thereof, including a first portion and a second portion. Herein, the first portion of the right-side elongated support 32 is pivotably coupled with the right-side vertical arm 30. Likewise, the left-side elongated support 32' has a first portion and a second portion, the first portion of the left-side elongated support 32' being pivotably coupled with the left-side vertical arm 30'. As shown, the right-side and left-side vertical arms 30, 30' having upper ends and lower ends, are coupled to the first portions of the right-side and left-side elongated supports 32, 32' as being pivotably coupled with the lower ends of the respective right-side and left-side vertical arms 30, 30' with the actuator 24 being powerable for moving the right-side and left-side vertical arms 30, 32 between positions inboard and outboard the vehicle 12.

With the fixed platform section 34 attached intermediate to the first portions of the right-side and left-side elongated supports 32, 32', a moveable platform section 36 is additionally coupled intermediate to the right-side and left-side elongated supports 32, 32' for movement between the first portions and the second portions thereof. To this end, the elongated supports provide side rails in which the moveable platform section 36 travels between the first and second portions. As discussed further, a linkage 38 is connected to the moveable platform section 36 for movement with the actuator 24 between a stowed orientation with the moveable platform section 36 stowed with the fixed platform section 34 at the first portions of the elongated supports 32, 32', and further providing a deployed orientation with the moveable platform section 36 moved to the second portions thereof for extending the platform structure 16 with the moveable platform section 36 moved into position alongside the fixed platform section 34 as shown in FIG. 4.

In FIG. 4 a dual-function barrier/transfer plate 40 is shown extended to bridge between the fixed platform section 34 of platform structure 16 and the vehicle inboard floor. In the illustrated transfer level position, it will be appreciated that the right-side and left-side elongated supports 32, 32' provide side barrier walls elevated from the fixed platform and moveable platform sections 34–36 providing roll-stops on the respective sides thereof, with the dual-function roll-stop barrier/transfer plate 40 providing respective roll-stop and transfer functions for access inboard the vehicle 12 at the floor thereof. Additionally, at the upward end of the platform structure 16, a roll-stop barrier 42 is elevated in the transfer position of FIG. 4. When in use, bridgeplates or roll-stops 40, 42 are raised at the outboard and inboard ends of the wheelchair platform to prevent a wheelchair located on the platform from accidentally rolling off the platform. Such roll-stops also function as ramps to facilitate movement of a wheelchair onto and off the wheelchair platform. The access system 10 further includes handrails 44, 44' extending horizontally from vertical arms 30, 30' when the platform structure 16 is deployed in horizontal positions as shown in FIGS. 4 and 5. The handrails 44, 44' fold vertically relative to vertical arms 30, 30' so as to extend along vertical arms 30, 30' when the platform structure 16 is in its vertically stowed position of FIG. 2. The platform structure 16 also includes torsion spring-loaded roll-stop feet 46, 46' to raise and lower the roll-stop 42 roll-stop position as between upright and FIG. 4 and extended in FIG. 5 allowing transfer of a wheelchair onto the platform structure 16 via the extended transfer level position. To make operation of the lift as convenient and safe as possible, the inboard and outboard roll-stops 40, 42 are automatically raised and lowered in response to the operation and position of the wheelchair lift 10. When the wheelchair platform 16 rests on the ground, the outboard roll-stop barrier 42 is lowered to provide a ramp onto the platform structure 16 and the inboard barrier plate 40 is raised to act as a stop. During lifting or lowering of the platform, both barriers 40, 42 are raised to act as stops to prevent a wheelchair from rolling off either end of the platform 16. When the platform 16 is raised to the height of the vehicle floor 14, the outboard barrier 42 remains raised to act as a stop and the inboard barrier 40 is lowered to provide a ramp between the platform 16 and the vehicle floor 14. As shown in FIG. 5 with the platform structure 16 extended downwardly as indicated by arrow 48 to a ground level position, the roll-stop 42 is extended with the roll-stop feet 46 establishing contact with the ground acting through a torsion bar to allow the spring-loaded roll-stop barrier 42 to extend.

Figure 6A:
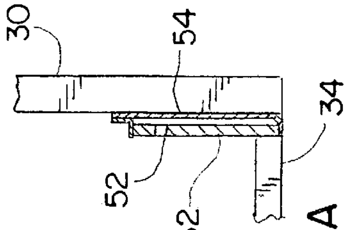
FIG. 6 and 6A show a perspective and cross-sectional view of the wheelchair access system in the deployed transfer level position with the fixed platform section and moveable platform section extended to provide the platform structure.
Figure 6:
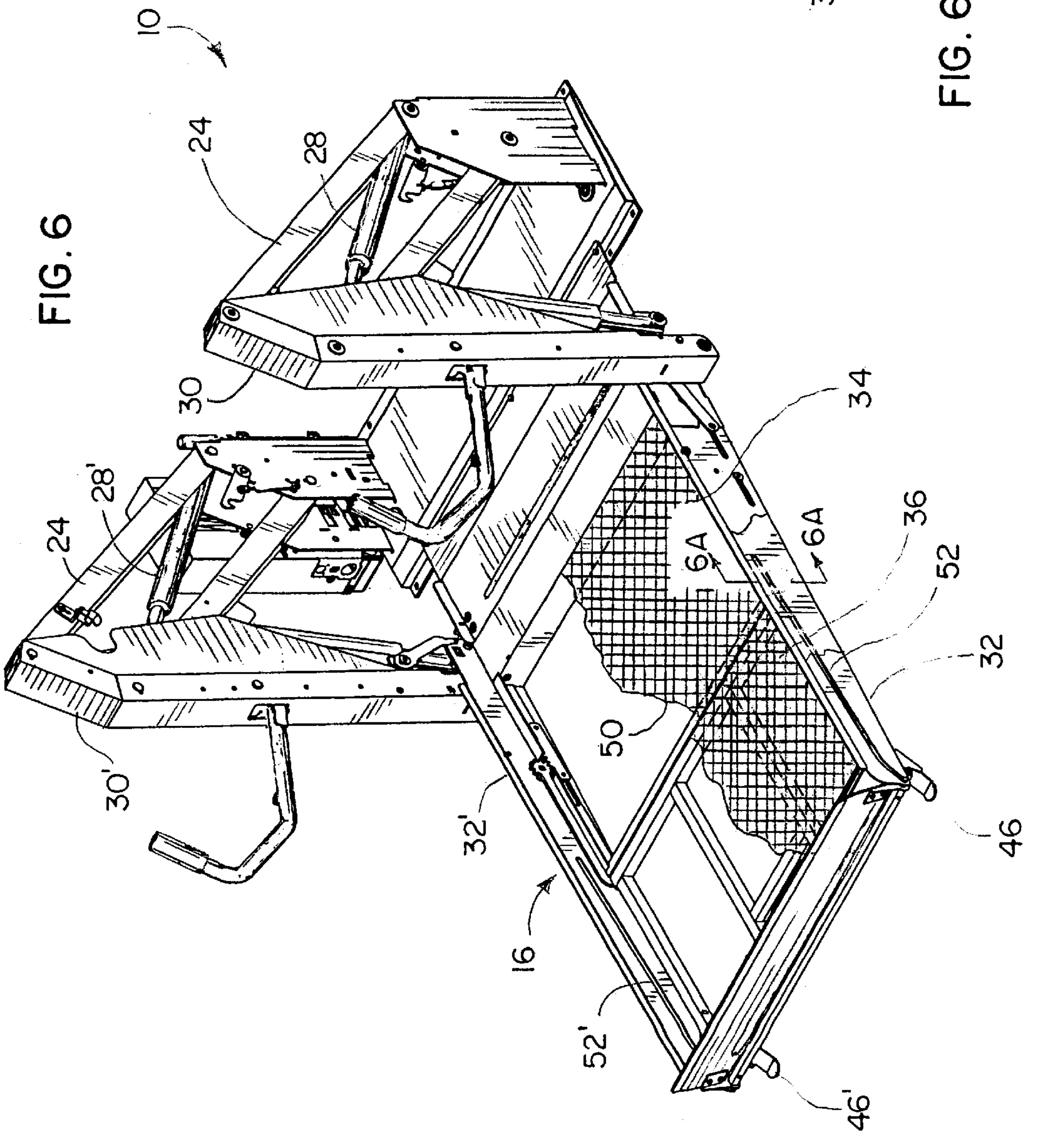

FIGS. 6 and 6A show a perspective and cross-sectional view of the wheelchair access system 10 in the deployed transfer level position of FIG. 4 with the fixed platform section 44 and the moveable platform section 36 extended to provide the platform structure 16 and its transfer position. As shown, the respective platform section surface plate covering platform section cover 50 is shown in mesh cross-section, which may be provided with appropriate support surfaces such as a meshed grid-like transfer surface or a solid plate-like surface that may provide a uniform, smooth running surface, such as an aluminum plate with non-slip powder coating adhered thereto.

A guiding portion, groove or track 52, 52' is provided on respective sides of the right-side and left-side elongated supports 32, 32' for receiving a roller or the like at the outer edges of the moveable platform section 36 for guiding the moveable platform section 36 along tracks 52, 52'. As shown in cross-section in FIG. 6A, the elongated support 32 with track 52 therein and a side wall covering 54 allows for a roller within track 52 employed for movement of the moveable platform 36. The side wall covering 54 thereby conceals the track and roller so as to provide a solid side wall barrier for the platform structure 16.

Figure 7:
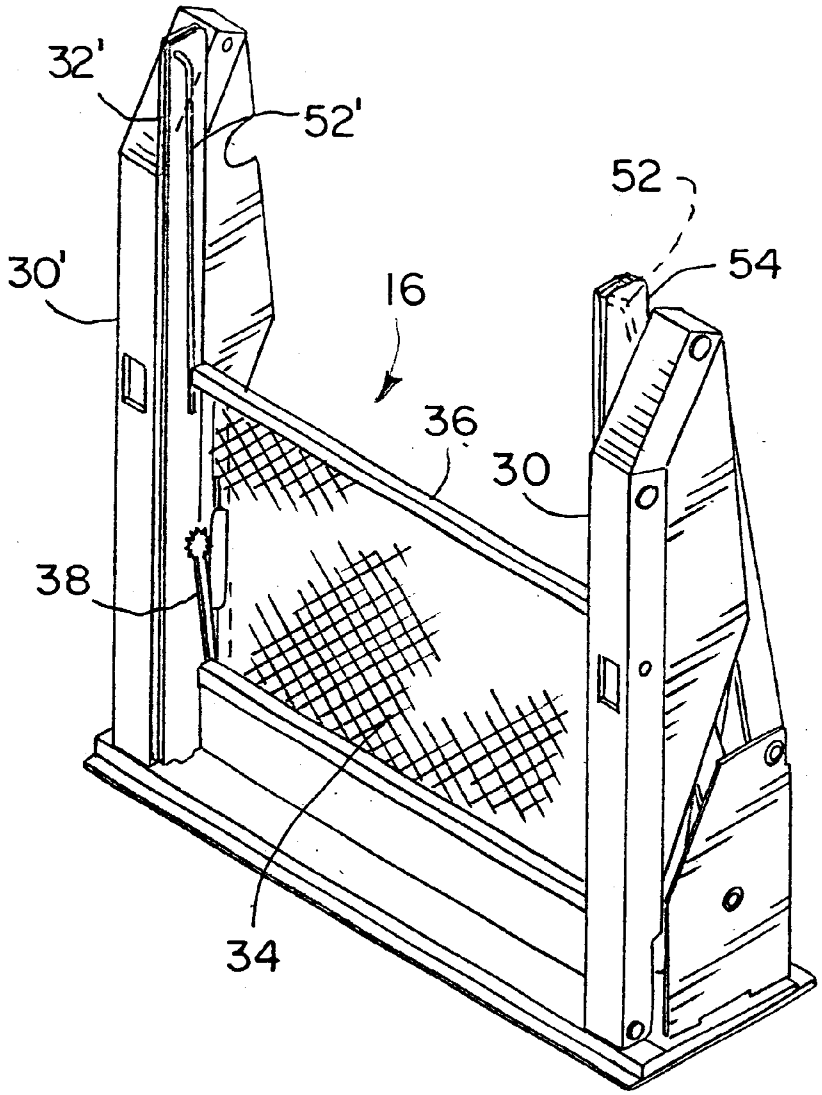
FIG. 7 illustrates the stowed orientation of the platform structure of the wheelchair lift providing a low vertical profile and compact overall profile.

FIG. 7 illustrates the stowed orientation of the platform structure 16 with the fixed and moveable platform sections 34, 36 stacked relative to one another to a reduced height configuration, avoiding obstruction of all or part of the window of the vehicle 12 adjacent to the lift access system 10 with a compact overall profile. It will be appreciated that the elongated supports 32, 32' facilitate a narrow profile in the stacking structure described herein, since the elongated supports 32, 32' remain extended rather than folded, which would require a wider profile dimension. As shown, tracks 52, 52' allow the moveable platform section 36 to be supported vertically therein, with the linkage 38 extended to the lower portion of the access system 10 to draw the moveable platform section 36 to the first portions of the right-side and left-side elongated supports 32, 32' in the stowed orientation.

Figure 8:
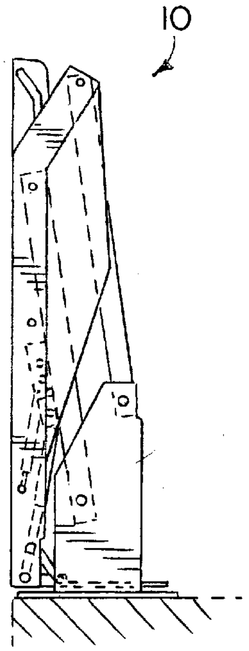
FIGS. 8–12 are side-elevation views of the wheelchair lift at different lift positions, with FIG. 8 showing the stowed orientation, partial deployment at FIG. 9 extending to transfer level deployment at FIG. 10, and FIG. 11 illustrating movement with the parallelogram structure to lower the platform structure to ground level at FIG. 12.
Figure 9:
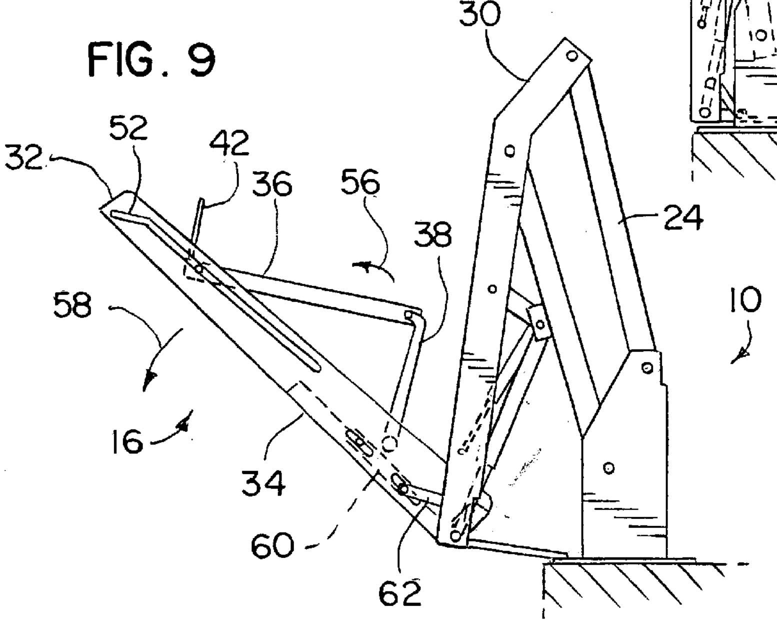
Figure 10:
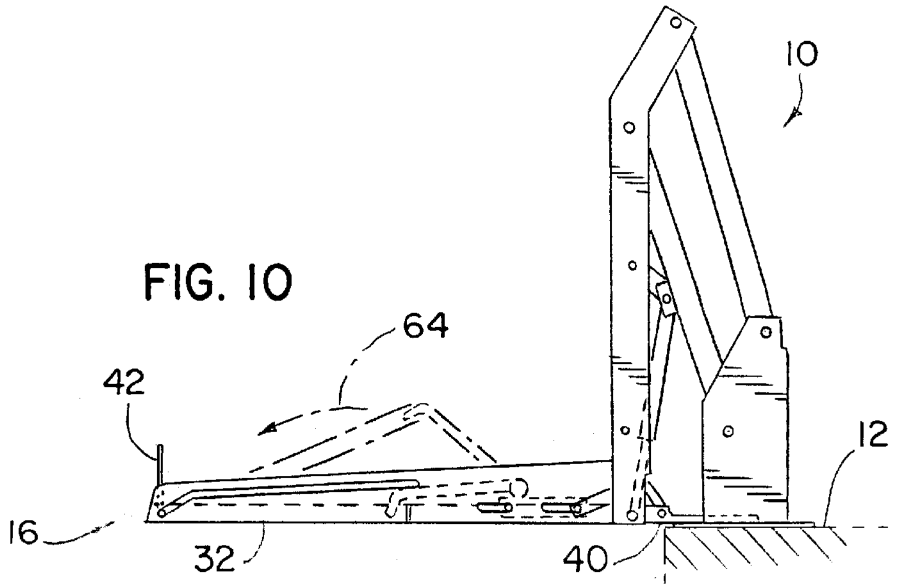
Figure 11:
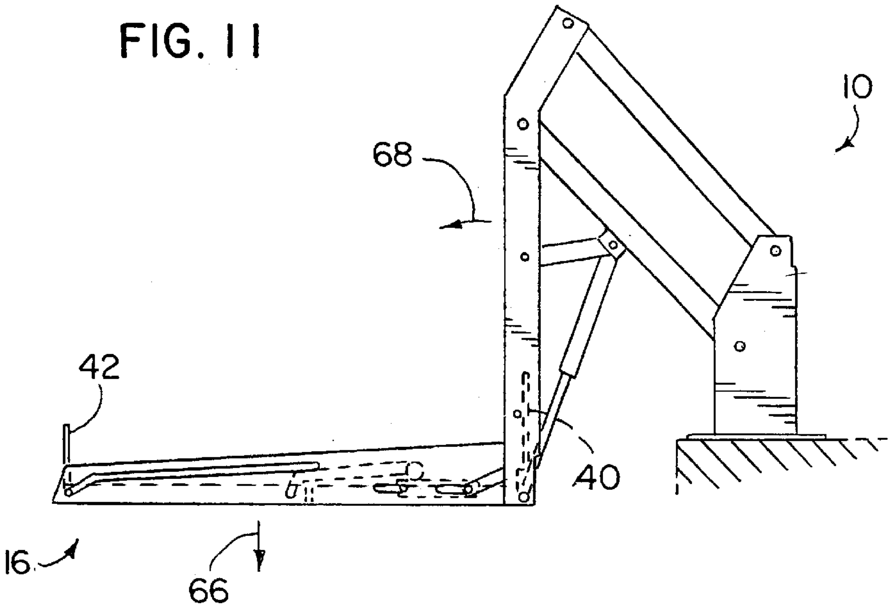
Figure 12:
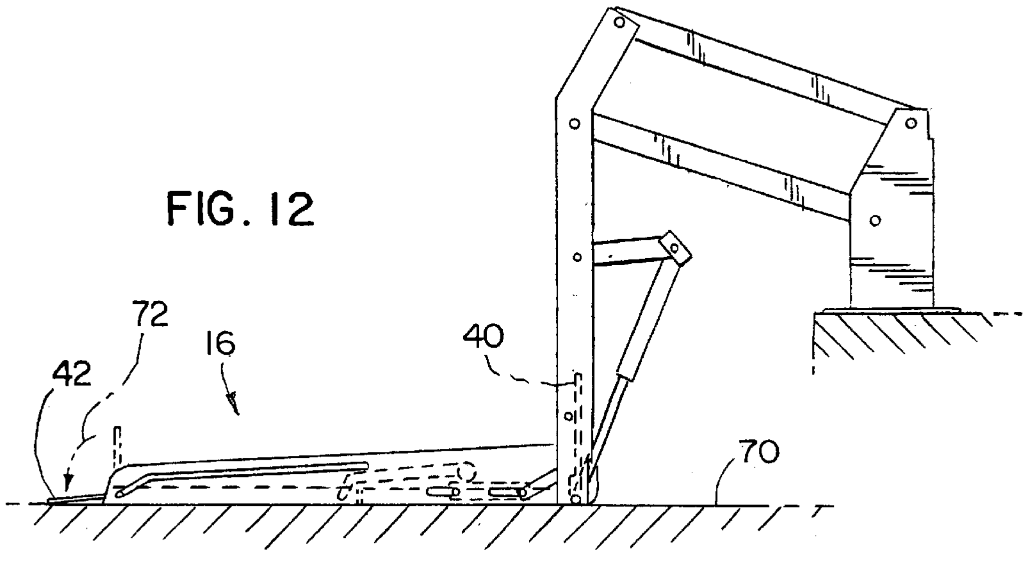

FIGS. 8–12 are side-elevation views of the wheelchair access system 10 at different lift positions, with FIG. 8 showing the stowed orientation, partial deployment at FIG. 9 extending to transfer level deployment at FIG. 10, and an intermediate position at FIG. 11 illustrates movement with the parallelogram structure 24 to lower the platform structure 16 to the ground level at FIG. 12. FIG. 8 particularly illustrates a side elevation view showing the narrow profile of the wheelchair access system 10 for compact storage within the vehicle 12. FIG. 9 particularly illustrates operation of the linkage 38 connected to the moveable platform section 36 for movement with the parallelogram structure actuator 24 from the stowed orientation with the moveable platform section 36 traveling along tracks 52, 52' of the elongated supports 32, 32'. Arrow 56 indicates movement of the moveable platform section 36 via linkage 38, and arrow 58 indicates the corresponding downward movement of the platform structure 16 as it is deployed upboard from its stowed orientation. As will be illustrated further below, the linkage 38 is connected to the moveable platform 36 for movement with the actuator 24 to extend the moveable platform section 36 from its stowed, co-located vertical orientation with the fixed platform section 34. The linkage 38 further includes a gear assembly 60 for coupling to the moveable platform section 36. The gear assembly 60 includes a rack gear and pinion arm assembly discussed further below, operable with the actuator 24 under control of a hydraulic subsystem with controlled operation of the parallelogram lift mechanism and controlled hydraulically for defined operational weights for deploying and stowing the platform structure 16 in accordance with safe operating protocol.

The deployment of the platform structure 16, and the moveable platform section 36 in particular, may be operated at a rate of deployment variably regulated with the hydraulic operation of the parallelogram lift mechanism of the actuator 24. Herein, the hydraulic circuit of the actuator 24 will be provided with variable orifice control valves (not shown) with a control interface providing proportional control of the hydraulic subsystem operable with the actuator 24. The gear assembly 60 has a control link 62, coupled with the vertical arm as discussed further below for controlling deployment of the moveable platform 36 with the actuator 24. FIG. 10 continues deployment of the system 10 as indicated by arrow 64 to provide the platform structure 16 in its transfer level position with the dual-function roll-stop barrier/transfer plate 40 extending to the floor of the vehicle 12, allowing transfer of the wheelchair between the vehicle 12 and the platform structure 16 of the access system 10. Further deployment thereafter, as illustrated in FIG. 11, raises the dual-function roll-stop barrier/transfer plate 40 for disembarking the passenger on the platform structure 16, which is lowered to ground level as indicated by the direction of arrow 66. The direction of arrow 68 indicates movement of the access system 10 outwardly and away from the vehicle 12. The platform structure 16 is brought to rest at ground level 70, as shown in FIG. 12, as the roll-stop barrier 42 is lowered in a motion 72, as the torsion spring-loaded roll-stop feet 46, 46' discussed in connection with FIG. 5 above, are brought to rest at ground level 70.

Figure 13:
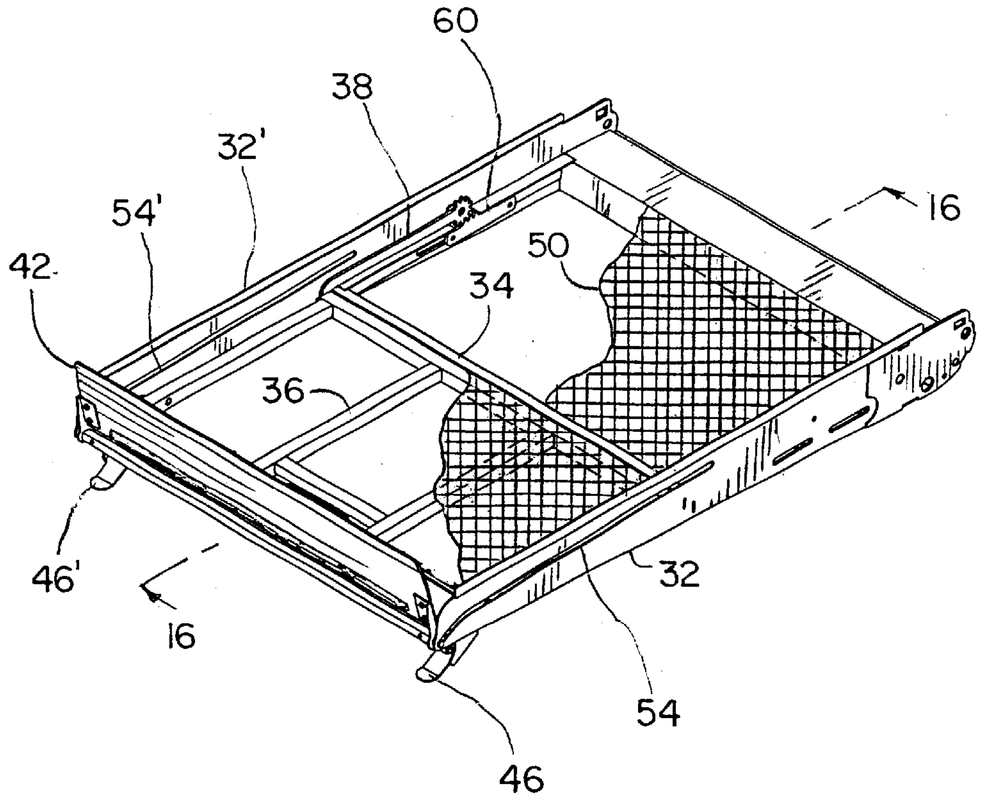
FIGS. 13–15 illustrate the platform structure with the floor plates sectioned to expose linkage and gear assemblies for movement of the moveable platform section with respect to the fixed section.
Figure 14:
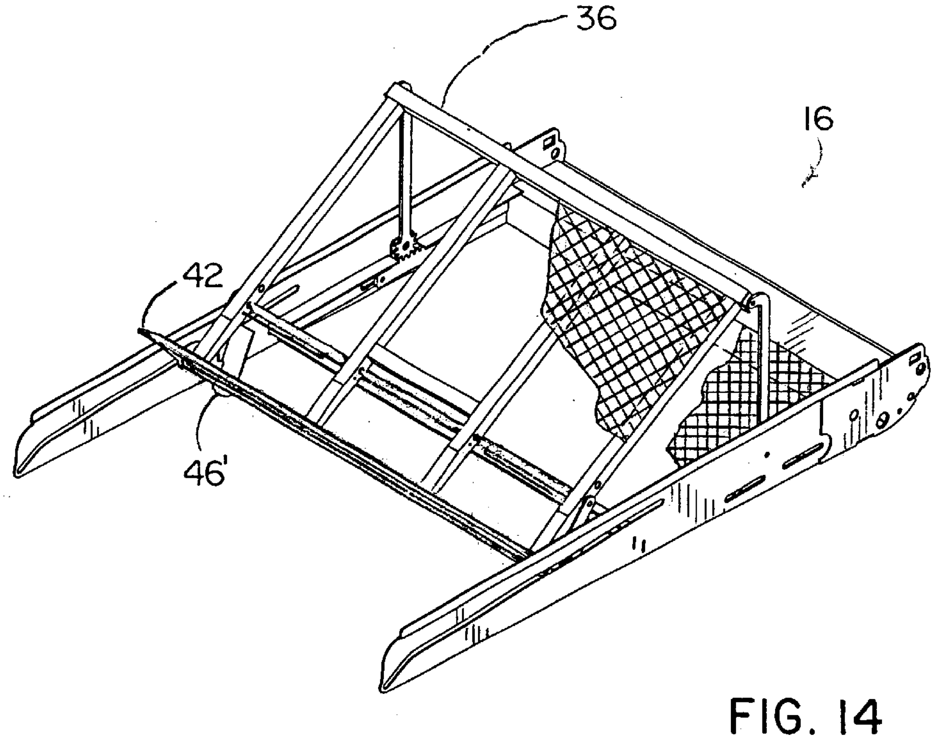
Figure 15:
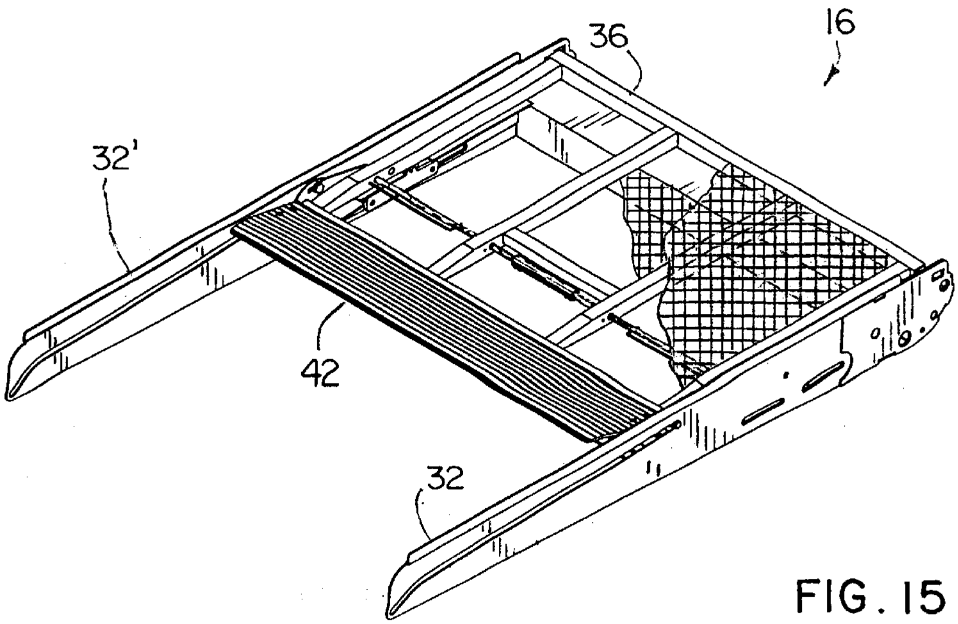

FIGS. 13–15 illustrate the platform structure 16 with the floor plate section cover 50 shown in cross-section to expose the linkage 38 and gear assembly 60 for movement of the moveable platform section 36 with respect to the fixed section 34. In FIG. 14, as the moveable platform section 36 is moved to its stowed orientation, the roll-stop barrier 42 raises as the roll-stop feet 46, 46' extend away from the ground level. But as the moveable platform section 36 becomes fully stowed, i.e., stacked with the fixed platform section 34 thereunder as shown in FIG. 15, the roll-stop feet 46, 46' as shown in connection with FIG. 18 again extend the roll-stop barrier 42 for a stowed orientation with a low profile with the elongated supports 32, 32'.

Figure 16:
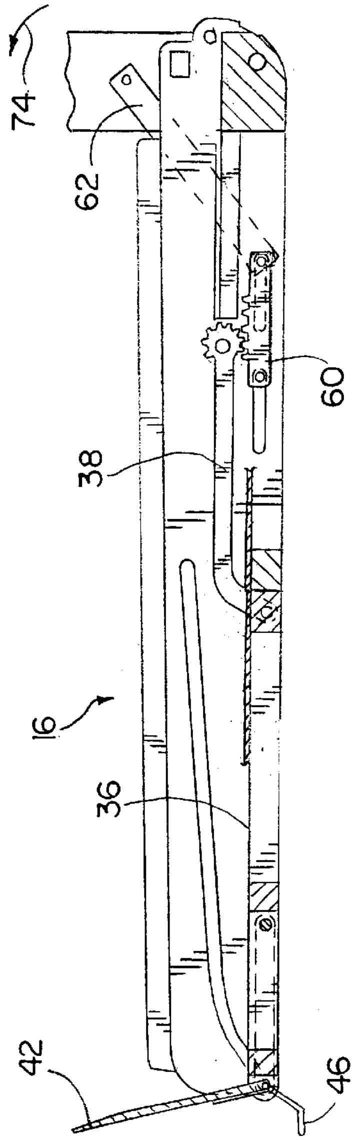
FIGS. 16–19 further illustrate deployment and particularly the rack gear and pinion linkage assemblies used in the platform structure of the wheelchair access system in accordance with the present invention.
Figure 17:
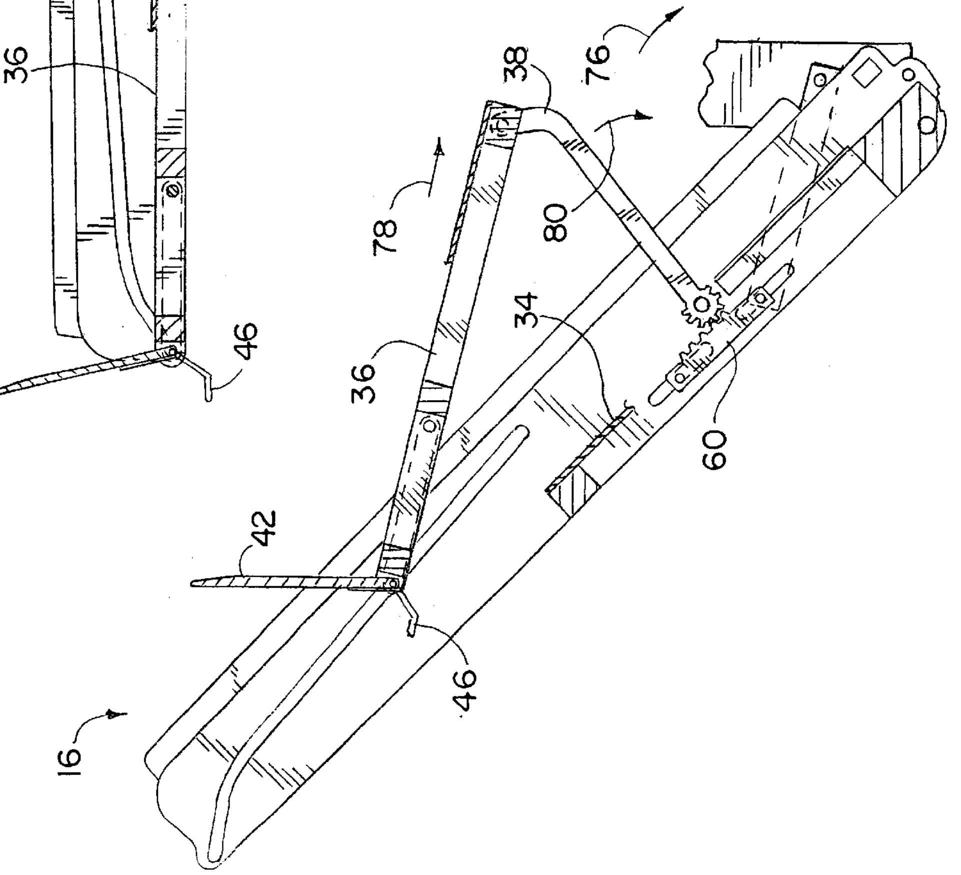
Figure 18:
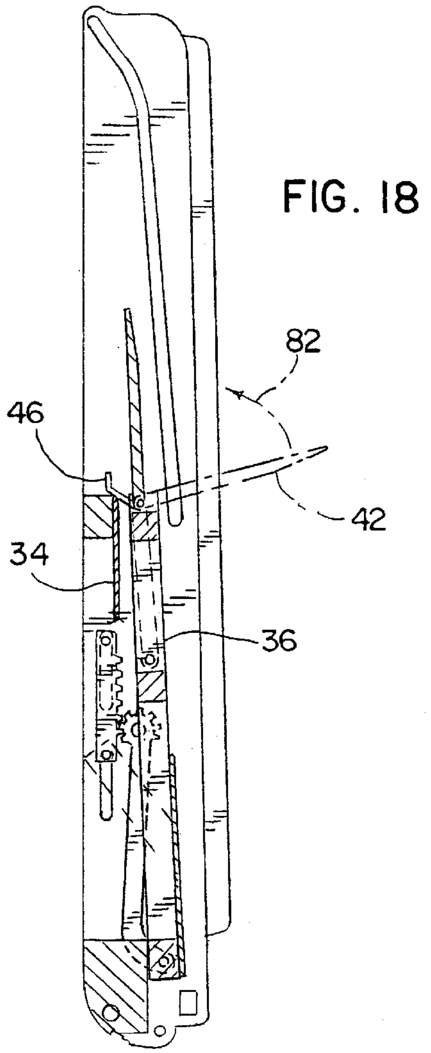
Figure 19:
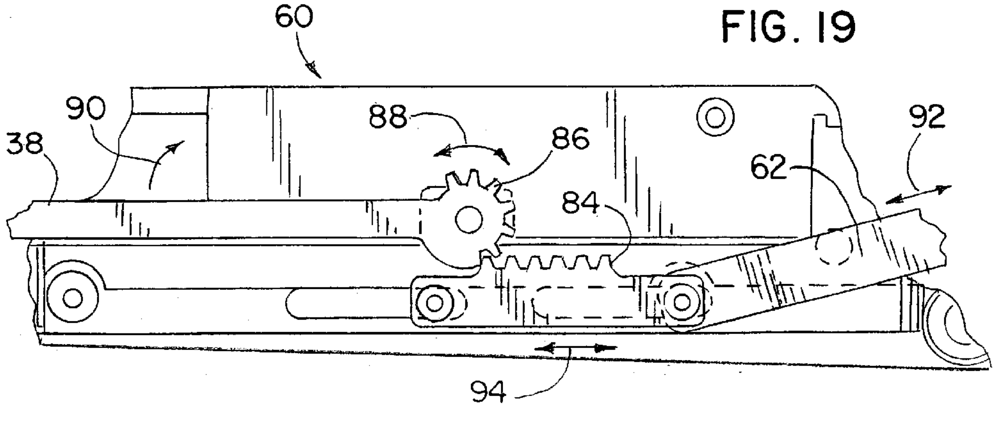

FIG. 16 provides a cross-sectional view of FIG. 13, and FIGS. 16–19 further illustrate the deployment and particularly the rack and pinion linkage assemblies of the gear assembly 60 used in the platform structure of the wheelchair access system 10, and illustrate stowing of the moveable platform section 36 and the barrier roll-stop 32 for the low-profile orientation of the platform structure 16 while stowed. FIG. 19 particularly illustrates the gear assembly 60 as discussed herein. The gear assembly 60 is coupled with the gear link 62 to the vertical arm 30, such that as the vertical arms 30, 32 move between deployed and stowed positions with the actuator 24, the vertical arm 30 tends to move as indicated by arrow 74 in FIG. 16 and arrow 76 in FIG. 17 to thereby move the linkage 38 with the gear assembly 60, causing movement of the moveable platform section 36 between stowed and deployed orientations as indicated with motion arrows 78 and 80 in FIG. 17. As shown in FIG. 18, as the moveable platform section 36 attains its fully-stowed orientation within the platform structure 16, the roll-stop barrier 42 moves to the extended stowed orientation as the roll-stop feet 46 come to rest against the upper surface of the fixed platform section 34. In FIG. 19, the gear assembly 60 is shown in exploded cross-section, showing rack gear teeth 84 and pinion gear teeth 86 for movement of the pinion arm as indicated by motion arrows 88 and 90, with the movement 92 indicated with gear link 62 for translating movement to the rack gear of the gear assembly as indicated by arrow 94. The rack and pinion gears are used to convert linear motion into rotation for precise control of the linkage 38 and the movement of the moveable platform section 36. The gear assembly 60 as illustrated in FIG. 19 may be deployed on one or both right-side and/or left-side elongated supports 32, 32' for control with the respective vertical arms, 30, 30' from the actuator 24 of the wheelchair access system 10.

While the present invention has been illustrated by a description of various embodiments and while these embodiments have been set forth in considerable detail, it is intended that the scope of the invention be defined by the appended claims. It will be appreciated by those skilled in the art that modifications to the foregoing preferred embodiments may be made in various aspects. It is deemed that the spirit and scope of the invention encompass such variations to the preferred embodiments as would be apparent to one of ordinary skill in the art and familiar with the teachings of the present application.

What is claimed is:

1. A wheelchair access system with a stacking platform for use in conjunction with a vehicle having a floor, comprising:

a right-side vertical arm;

a right-side elongated support having a first portion and a second portion, the first portion of the right-side elongated support being pivotably coupled with the right-side vertical arm;

a left-side vertical arm;

a left-side elongated support having a first portion and a second portion, the first portion of the left-side elongated support being pivotably coupled with the left-side vertical arm;

a fixed platform section attached intermediate the first portions of the right-side and left-side elongated supports;

an actuator powerable for moving the right-side and left-side vertical arms between positions outboard and inboard the vehicle;

a moveable platform section coupled intermediate the right-side and left-side elongated supports for movement between the first portions and the second portions of the right-side and left-side elongated supports; and a linkage connected to the moveable platform section for movement with the actuator between a stowed orientation with the moveable platform section stowed with the fixed platform section at the first portions of the right-side and left-side elongated supports, and a deployed orientation with the moveable platform section moved to the second portions of the right-side and left-side elongated supports.

2. A wheelchair access system as recited in claim 1, wherein each of the right-side and left-side vertical arms comprise an upper end and a lower end, with the first portions of the right-side and left-side elongated supports being pivotably coupled with the lower ends of the respective right-side and left-side vertical arms.

3. A wheelchair access system as recited in claim 1, wherein the actuator moves the right-side and left-side vertical arms to thereby move the right-side and left-side elongated supports, the fixed platform section and the moveable platform section between a ground level position, a horizontal transfer level position and a vertically-stowed position.

4. A wheelchair access system as recited in claim 3, wherein the linkage connected to the moveable platform section stows the moveable platform section, which is co-located vertically with the fixed platform section at the first portions of the right-side and left-side elongated supports.

5. A wheelchair access system as recited in claim 3, wherein the linkage connected to the moveable platform section deploys the moveable platform section alongside the fixed platform section horizontally with the fixed platform section at the first portions and the moveable platform section at the second portions of the right-side and left-side elongated supports.

6. A wheelchair access system as recited in claim 5, wherein the right-side elongated support and the left-side elongated support extend upwardly from the fixed platform section and the moveable platform section in the deployed orientation providing sidewall barriers.

7. A wheelchair access system as recited in claim 1, wherein the first and second portions of the right-side and left-side elongated supports include respective halves of each elongated support.

8. A wheelchair access system as recited in claim 1, wherein the linkage is coupled with at least one of the right-side and left-side vertical arms for movement of the moveable platform structure with the actuator.

9. A wheelchair access system as recited in claim 1, comprising a second linkage such that each linkage is connected to one of the right-side and left-side vertical arms for movement of the moveable platform section with the actuator.

10. A wheelchair access system as recited in claim 1, wherein the linkage comprises a gear assembly for coupling to the moveable platform section.

11. A wheelchair access system as recited in claim 10, wherein the linkage comprises a rack gear and a pinion arm coupled with the moveable platform section.

12. A wheelchair access system as recited in claim 1, wherein the actuator comprises a hydraulic subsystem for controlling a parallelogram lift mechanism.

13. A wheelchair access method using a stacking platform in conjunction with a vehicle having a floor, comprising:

pivotably coupling a right-side elongated support with a deployment arm, the right-side elongated support providing a first portion and a second portion thereon with the first portion of the right-side elongated support being proximal to the deployment arm;

pivotably coupling a left-side elongated support with a deployment arm, the left-side elongated support providing a first portion and a second portion thereon with the first portion of the left-side elongated support being proximal to the deployment arm;

attaching a fixed platform section intermediate to the first portions of the right-side and the left-side elongated supports;

providing an actuator for powering the deployment arms between positions outboard and inboard the vehicle;

coupling a moveable platform intermediate to the right-side and left-side elongated supports for movement between the first portions and the second portions of the right-side and left-side elongated supports; and connecting a linkage to the moveable platform section for movement with the actuator between a stowed orientation with the moveable platform section stowed with the fixed platform section at the first portions of the right-side and left-side elongated supports, and a deployed orientation with the moveable platform moved to the second portions of the right-side and left-side elongated supports.

14. A wheelchair access method as recited in claim 13, comprising moving the right-side and left-side elongated supports, the fixed platform section and the moveable platform section between a ground-level position, and horizontal transfer level position and a vertically-stowed position with the actuator moving the right-side and left-side vertical arms between positions outboard and inboard the vehicle.

15. A wheelchair access method as recited in claim 14, wherein the connecting of the linkage translates movement from the right-side and left-side vertical arms to the moveable platform section.

16. A wheelchair access method as recited in claim 15, wherein the connecting step operates the linkage for stowing the moveable platform section co-located vertically with the fixed platform section, and is further operable for deploying the moveable platform section alongside the fixed platform section horizontally.

17. A wheelchair access method as recited in claim 13, comprising coupling the linkage with at least one of the right-side and left-side vertical arms for movement of the moveable platform structure with the actuator.

18. A wheelchair access system with a stacking platform for use in conjunction with a vehicle having a floor, comprising:

means for pivotably coupling a right-side elongated support with a deployment arm, the right-side elongated support providing a first portion and a second portion thereon with the first portion of the right-side elongated support being proximal to the deployment arm;

means for pivotably coupling a left-side elongated support with a deployment arm, the left-side elongated support providing a first portion and a second portion thereon with the first portion of the left-side elongated support being proximal to the deployment arm;

means for attaching a fixed platform section intermediate to the first portions of the right-side and the left-side elongated supports;

means for providing an actuator for powering the deployment arms between positions outboard and inboard the vehicle;

means for coupling a moveable platform intermediate to the right-side and left-side elongated supports for movement between the first portions and the second portions of the right-side and left-side elongated supports; and means for connecting a linkage to the moveable platform section for movement with the actuator between a stowed orientation with the moveable platform section stowed with the fixed platform section at the first portions of the right-side and left-side elongated supports, and a deployed orientation with the moveable platform moved to the second portions of the right-side and left-side elongated supports.

19. A wheelchair access system as recited in claim 18, wherein the means for connecting the linkage to the moveable platform section comprises a gear assembly means for coupling the actuator's powering of the deployment arms to the moveable platform section for movement between the stowed orientation and the deployed orientation.

20. A wheelchair access system as recited in claim 19, wherein the gear assembly means comprises a rack gear and a pinion arm.

* * * * *